US012769304B2

(12) United States Patent
Mähler et al.

(10) Patent No.: US 12,769,304 B2
(45) Date of Patent: Oct. 20, 2026

(54) METHOD AND SYSTEM FOR MONITORING OPERATION OF AN AUTONOMOUS AGRICULTURAL PRODUCTION MACHINE

(71) Applicant: CLAAS Selbstfahrende Erntemaschinen GmbH, Harsewinkel (DE)

(72) Inventors: Reinhold Mähler, Rheda-Wiedenbrück (DE); Christian Ehlert, Bielefeld (DE); Bastian Bormann, Gütersloh (DE); Joachim Baumgarten, Beelen (DE); Dennis Neitemeier, Lippetal (DE); Johann Witte, Fröndenberg (DE); Jannik Redenius, Oldendorf (DE); Arne Bohl, Gütersloh (DE); Eberhard Nacke, Gütersloh (DE); Christoph Apke, Bielefeld (DE); Timo Korthals, Leopoldshöhe (DE); Waldemar Thiesmann, Osnabrück (DE); Axel Schröder, Gütersloh (DE); Robin Monkenbusch, Rheda-Wiedenbrück (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 319 days.

(21) Appl. No.: 18/139,532

(22) Filed: Apr. 26, 2023

(65) Prior Publication Data

US 2023/0350409 A1 Nov. 2, 2023

(30) Foreign Application Priority Data

Apr. 27, 2022 (DE) ..................... 10 2022 110 130.4

(51) Int. Cl.
*G05D 1/00* (2024.01)

(52) U.S. Cl.
CPC ......... *G05D 1/0055* (2013.01); *G05D 1/0022* (2013.01); *G05D 1/0027* (2013.01); *G05D 1/0088* (2013.01)

(58) Field of Classification Search
CPC ... G05D 1/0055; G05D 1/0297; A01B 69/008
See application file for complete search history.

(56) References Cited

U.S. PATENT DOCUMENTS 5,712,782 A 1/1998 Weigelt et al.
6,803,854 B1 10/2004 Adams et al.
(Continued)

FOREIGN PATENT DOCUMENTS

DE 19914829 A1 1/2001
DE 102006045280 A1 4/2008
(Continued)

OTHER PUBLICATIONS

English Translation for EP-3272950-A1 (Year: 2018).*
(Continued)

*Primary Examiner* — Faris S Almatrahi
*Assistant Examiner* — Moises Gasca Alva
(74) *Attorney, Agent, or Firm* — Lempia Summerfield Katz LLC

(57) ABSTRACT

A method and a system for monitoring the operation of at least one autonomous agricultural production machine is disclosed. The method comprises collecting data representing the operating parameters and environmental parameters of the autonomous agricultural production machine and detecting an irregularity based on the data. Once an irregularity is determined, the collected data are transmitted to a database and saved there. The irregularity is identified by processing the collected data in an analysis routine, and an instruction is generated for switching the autonomous agricultural production machine from a safe operating state to a
(Continued)

normal operating state depending on the identified irregularity, and the instruction is executed.

20 Claims, 2 Drawing Sheets

(56) References Cited

U.S. PATENT DOCUMENTS

| | | | | |
|---|---|---|---|---|
| 7,873,617 | B2 | 1/2011 | Wippersteg et al. | |
| 11,466,998 | B1 | 10/2022 | Williams et al. | |
| 2002/0103688 | A1 | 8/2002 | Schneider | |
| 2007/0005202 | A1 | 1/2007 | Breed | |
| 2008/0005177 | A1 | 1/2008 | Steckel et al. | |
| 2008/0098035 | A1 | 4/2008 | Wippersteg et al. | |
| 2010/0094499 | A1 | 4/2010 | Anderson | |
| 2015/0105965 | A1 | 4/2015 | Blackwell et al. | |
| 2015/0377945 | A1 | 12/2015 | Schlipf et al. | |
| 2016/0340867 | A1* | 11/2016 | Matsuzaki | E02F 9/2045 |
| 2017/0131718 | A1* | 5/2017 | Matsumura | H04N 23/11 |
| 2017/0192431 | A1 | 7/2017 | Foster | |
| 2017/0228832 | A1 | 8/2017 | Tuttle | |
| 2017/0301151 | A1* | 10/2017 | Murata | H04M 11/00 |
| 2017/0311534 | A1* | 11/2017 | Rusciolelli | A01B 79/005 |
| 2017/0336787 | A1 | 11/2017 | Pichlmaier et al. | |
| 2018/0173233 | A1 | 6/2018 | Matsuzaki | |
| 2018/0225892 | A1 | 8/2018 | Miura | |
| 2018/0232674 | A1 | 8/2018 | Bilde | |
| 2018/0319392 | A1* | 11/2018 | Posselius | G01S 13/931 |
| 2019/0035282 | A1 | 1/2019 | Ferguson et al. | |
| 2019/0235487 | A1* | 8/2019 | Zhao | H04W 4/44 |
| 2019/0364734 | A1 | 12/2019 | Kriebel et al. | |
| 2020/0159220 | A1 | 5/2020 | Hurd | |
| 2020/0285970 | A1 | 9/2020 | Dagley et al. | |
| 2020/0404846 | A1 | 12/2020 | Fattey et al. | |
| 2021/0089051 | A1 | 3/2021 | Markov et al. | |
| 2021/0173399 | A1 | 6/2021 | Richard et al. | |
| 2021/0357664 | A1* | 11/2021 | Kocer | G05D 1/0282 |
| 2022/0067846 | A1 | 3/2022 | Grundmann | |
| 2022/0087091 | A1* | 3/2022 | Nieto Lara | A01B 69/00 |
| 2022/0198643 | A1* | 6/2022 | Sharma | G06F 18/24 |
| 2022/0269282 | A1* | 8/2022 | Ascherl | G05D 1/0238 |
| 2022/0366730 | A1 | 11/2022 | Mangus et al. | |
| 2022/0400597 | A1 | 12/2022 | Tamatani et al. | |
| 2022/0414608 | A1 | 12/2022 | Kocer | |
| 2023/0152797 | A1 | 5/2023 | Hurd | |
| 2023/0350407 | A1 | 11/2023 | Mahler | |
| 2023/0367333 | A1 | 11/2023 | Hoellinger et al. | |

FOREIGN PATENT DOCUMENTS

| | | | | |
|---|---|---|---|---|
| DE | 102018113327 | A1 | 12/2019 | |
| DE | 102019000792 | A1 | 8/2020 | |
| DE | 102020104064 | A1 | 8/2021 | |
| EP | 0740896 | B1 | 12/2007 | |
| EP | 2174537 | A1 | 4/2010 | |
| EP | 2177965 | A2 | 4/2010 | |
| EP | 2177965 | B1 | 3/2015 | |
| EP | 3272950 | A1 * | 1/2018 | E02F 9/267 |
| EP | 3336646 | A1 | 6/2018 | |
| EP | 3783529 | A1 | 2/2021 | |
| EP | 3864945 | A1 | 8/2021 | |
| EP | 3965030 | A1 | 3/2022 | |
| WO | 2015173073 | A1 | 11/2015 | |

OTHER PUBLICATIONS

European Search Report for European Patent Application No. 23155831.3 dated Oct. 13, 2023.

Jensen, Martin Andreas Falk, et al. "In-field and inter-field path planning for agricultural transport units." Computers & Industrial Engineering 63.4 (2012): 1054-1061.

* cited by examiner

METHOD AND SYSTEM FOR MONITORING OPERATION OF AN AUTONOMOUS AGRICULTURAL PRODUCTION MACHINE

CROSS REFERENCE TO RELATED APPLICATION

This application claims priority under 35 U.S.C. § 119 to German Patent Application No. DE 10 2022 110 130.4 filed Apr. 27, 2022, the entire disclosure of which is hereby incorporated by reference herein. This application incorporates by reference herein the following US applications in their entirety: U.S. application Ser. No. 18/139,520 entitled "AUTONOMOUS AGRICULTURAL PRODUCTION MACHINE"; U.S. application Ser. No. 18/139,525 entitled "SWARM ASSISTANCE SYSTEM AND METHOD FOR AUTONOMOUS AGRICULTURAL UNIVERSAL PRODUCTION MACHINES"; U.S. application Ser. No. 18/139,528 entitled "METHOD AND SYSTEM FOR MONITORING AUTONOMOUS AGRICULTURAL PRODUCTION MACHINES"; and U.S. application Ser. No. 18/139,538 entitled "SYSTEM AND METHOD FOR DEPLOYMENT PLANNING AND COORDINATION OF A VEHICLE FLEET".

TECHNICAL FIELD

The present application relates to a method for monitoring at least one autonomous agricultural production machines and to an autonomous agricultural production machine.

BACKGROUND

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

In modern agriculture, efforts are increasingly to perform agricultural processes autonomously in order to increase the productivity and economy of the processes. For this purpose, so-called autonomous agricultural production machines are used which may be characterized in that there is no operator in a cabin to control them. Accordingly, with autonomous agricultural production machines, no operator is available who may understand the agricultural work process to be performed with a sequence of different work steps. Instead, the operator may perform individual control functions while the autonomous production machine is operating on an agricultural area. Such autonomous agricultural production machines are therefore also referred to as unmanned agricultural production machines.

WO 2015/173073 A1 discloses a method for harvesting harvested material using manned agricultural production machines and unmanned agricultural production machines, i.e. autonomous agricultural production machines. The operation and the distance covered by an unmanned agricultural production machine during its operation on an agricultural area are controlled in this case by the operator of a manned agricultural production machine. For this purpose, the operator is continuously in the immediate vicinity of the autonomous agricultural production machines during their operation. The operator of the manned agricultural production machine is therefore able to visually monitor the operation of the unmanned agricultural production machines and to control the unmanned agricultural production machines according to the planned use via wireless remote control.

BRIEF DESCRIPTION OF THE DRAWINGS

The present application is further described in the detailed description which follows, in reference to the noted drawings by way of non-limiting examples of exemplary implementation, in which like reference numerals represent similar parts throughout the several views of the drawings, and wherein.

DETAILED DESCRIPTION

Figure 1:
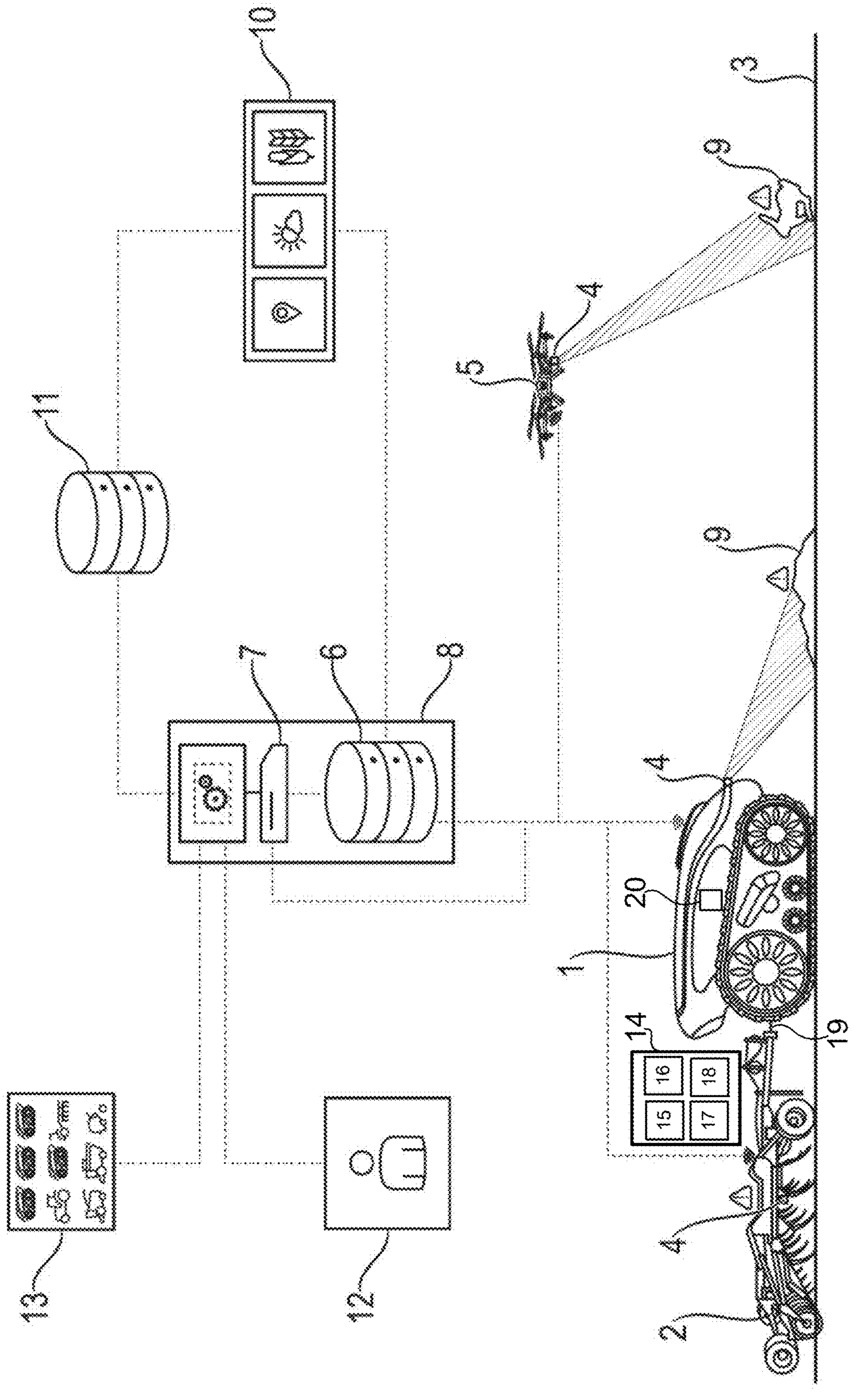
FIG. 1 illustrates a schematic and exemplary representation of devices for performing the method.

As discussed in the background, WO 2015/173073 A1 discloses a method for harvesting harvested material using manned agricultural production machines and unmanned agricultural production machines, i.e. autonomous agricultural production machines. For this purpose, the operator is continuously in the immediate vicinity of the autonomous agricultural production machines during their operation. The operator of the manned agricultural production machine is therefore able to visually monitor the operation of the unmanned agricultural production machines and to control the unmanned agricultural production machines according to the planned use via wireless remote control.

A disadvantage of such a method is that the operation of the autonomous agricultural production machine is necessarily linked to the presence of an operator of a manned agricultural production machine who is always in the immediate vicinity of the unmanned agricultural production machine in order to be able to control it remotely. Although, in principle, work steps may be performed autonomously or automatically by the unmanned production machines, in such a configuration, the proximity of a person is always required for the autonomous agricultural production machine to perform the work steps.

Accordingly, based on the aforementioned prior art, it is the object of the present invention to disclose a method and a system that allows planned and autonomous execution of working step(s) by an autonomous agricultural production machine without the need for a person to be in the vicinity of the autonomous agricultural production machine (thereby avoiding the need for a person to monitor (such as continuously monitor) the operation of the autonomous agricultural production machine and/or control the autonomous agricultural production machine during execution).

Rather, in one or some embodiments, detection of an irregularity (such as by the autonomous agricultural production machine) may trigger a sequence of actions that may be performed by one or both of the autonomous agricultural production machine or a remote electronic device (such as a management system 8). In particular, the autonomous agricultural production machine and the remote electronic device may work in combination, as discussed further below, in order to avoid having a person constantly be in the vicinity of the agricultural production machine.

In one or some embodiments, a method for monitoring operation of at least one autonomous agricultural production machine is disclosed. Using at least one sensor device, data representing operating parameters and/or environmental parameters of the autonomous agricultural production machine are determined while the autonomous agricultural production machine is operating. Based on the collected data, a control device may detect an irregularity during operation of the autonomous agricultural production machine, wherein the sensor device transmits (such as wired and/or wirelessly transmits) data (e.g., sensed data indicative of a sensed state) to the control device, the control device identifies or determines the irregularity, and the control device informs (e.g., commands) the autonomous agricultural production machine to operate in a safe operating state (e.g., responsive to receiving an indication by the control device of a detected irregularity, the autonomous agricultural production machine interrupts its current operation and switches to a safe operating state). The method may further comprise that the collected data is transmitted to a database as soon as the irregularity is detected (e.g., responsive to the control device detecting the irregularity, the control device and/or the autonomous agricultural production machine transmits (wired and/or wirelessly) the collected data to the database for storage). The database may communicate with the sensor device and/or the control device to transmit the data. The data detected by the sensor device may be saved in the database. The control device may detect or identify the irregularity using a processing device, whereby the processing device processes the collected data in an analysis routine. In turn, the processing device may communicate with the database in order to transmit data. Further, in one or some embodiments, an electronic device, such as a part of the control device (e.g., the processing device), may generate instruction(s) indicative to the autonomous agricultural production machine to switch from the normal operating state to the safe operating and vice versa (from the safe operating state to the normal operating state) depending on the identified irregularity. In one or some embodiments, the normal operating state comprises a state in which operation of the autonomous agricultural production machine continues (e.g., is uninterrupted). In this regard, the instruction for switching the autonomous agricultural production machine from the safe operating state to the normal operating state (and vice-versa) may be executed by the processing device.

In one or some embodiments, the method makes it possible to continuously monitor the operation of an autonomous agricultural production machine in order to identify, early on, possible irregularities that may occur during the operation of the autonomous agricultural production machine that could lead to a critical operating situation, and to trigger appropriate measures to overcome the irregularity. The term "continuous" or "continuously" may generally refer to processes which occur repeatedly over time independent of an external trigger to instigate subsequent repetitions. In some instances, continual processes may repeat in real time, having minimal periods of inactivity between repetitions. In some instances, periods of inactivity may be inherent in the continual process. In one or some embodiments, at least one electronic device, such as the remote monitoring center, may monitor one or more aspects of an agricultural production machine (such as autonomous agricultural production machine) regarding one or more aspects of an agricultural job such as any one, any combination, or all of: preparation of the autonomous agricultural production machine for the agricultural job (e.g., obtaining the work unit(s), obtaining the necessary elements, such as gasoline, etc. to prepare to perform the job; etc.); approach of the autonomous agricultural production machine to the agricultural job (e.g., monitoring the actual path of the autonomous agricultural production machine as the autonomous agricultural production machine physically moves itself to the field where the agricultural job will be performed); performance of the autonomous agricultural production machine of the agricultural job in the field; or follow-up after the autonomous agricultural production machine performs the agricultural job in the field (e.g., movement to the next field; unloading the harvested crop; cleaning the autonomous agricultural production machine or the field after performing the agricultural job; etc.).

In one or some embodiments, at least some or all method steps, including execution of the instruction for switching the autonomous agricultural production machine from the safe operating state to the normal operating state (and optionally vice versa) may be executed automatically (e.g., without intervention by a person who is on, or in the vicinity of, the autonomous agricultural production machine). In other words, a person need not be continuously required where things are happening to monitor the operation of the autonomous agricultural production machine and need not exert an influence on the autonomous agricultural production machine.

On the contrary, using the sensor device, sensor data representing or indicating operating and/or environmental parameters of the autonomous agricultural production machine may be generated (such as generated continuously) at least at certain points in time during the operation of the autonomous agricultural production machine. The control device may use the data obtained or generated by the sensor device in order for the control device to detect an irregularity that could lead to a critical operating situation. If such an irregularity occurs in the operation of the autonomous agricultural production machine, the operation of the autonomous agricultural production machine may be immediately interrupted (e.g., stopped) to prevent a critical operating situation of the autonomous agricultural production machine. At the same time (or nearly at the same time, such as responsive to detecting the irregularity), the data detected by the sensor device at the time of the occurrence of the irregularity (e.g., the data that was used by the control device to detect the irregularity) may be transmitted to the database, and the detected irregularity may be identified using the processing device based on this data.

In one or some embodiments, the control device may execute an analysis routine to analyze the collected data (e.g., the data generated by the sensor(s)) and to identify the irregularity that has occurred from the analysis of the collected data. In particular, the control device, executing the analysis routine by its processing device, processes the collected data to determine or identify a particular irregularity (e.g., the processing device selects a particular type of irregularity from a discrete set of potential irregularities). Depending on the identified irregularity, the control device (e.g., the processing unit) may generate an instruction and execute the instruction, which upon execution of the instruction enables the autonomous agricultural production machine to be put back into operation (e.g., normal operation). After being put back into operation, the autonomous agricultural production machine may continue or resume the work step previously being performed.

In one or some embodiments, the analysis routine may be configured to identify the irregularity and may determine at least one aspect of the irregularity identified (e.g., a type of the irregularity) from analysis of the obtained data. For example the analysis routine may comprise an analysis algorithm, such as an adaptive analysis algorithm (e.g., an analysis algorithm based on artificial intelligence, such as an artificial neural network). Before performing a first identification, the adaptive analysis algorithm may be trained using an initial data set defining assignments of data concerning various operating parameters and environmental parameters of autonomous agricultural production machines and irregularities made by manual annotation. In this way, the training of the adaptive analysis algorithm may comprise supervised training. Alternatively, the training of the adaptive analysis algorithm may comprise unsupervised training. In one or some embodiments, the data obtained and irregularities identified while performing the method may be used to further train (or to re-train) the analysis algorithm.

Accordingly, the method may allow work steps to be safely and reliably executed by autonomous agricultural production machines, wherein all the advantages of an autonomous execution of work steps may be fully exploited. The skills of an individual, which may have been necessary in the prior art to control the unmanned agricultural production machines, may therefore be used for other agricultural tasks.

In one or some embodiments, the instruction may be generated by the processing device and sent to the autonomous agricultural production machine, with the instruction indicating to the autonomous agricultural production machine to continue operating. Alternatively, or in addition, the instruction may comprise a rule defining a transmission of a modified route for the autonomous agricultural production machine. In this regard, the instruction may be indicative of a change of at least one aspect of operation (e.g., the route) to the autonomous agricultural production machine.

Alternatively (or in addition) to the rule defining a command by the processing device to the autonomous agricultural production machine to continue operation, the instruction may comprise a rule that includes assigning a person to switch the autonomous agricultural production machine from the safe operating state to the normal operating state (e.g., the instruction indicates that a person is to operate the autonomous agricultural production machine in order to effect the switch from the safe operating state to the normal operating state). For example, responsive to the autonomous agricultural production machine receiving the instruction indicating that a person is to switch the autonomous agricultural production machine from the safe operating state to the normal operating state, the autonomous agricultural production machine may wait until a person has provided input at or on the autonomous agricultural production machine (e.g., via a user interface attached to the autonomous agricultural production machine). Responsive to receipt of the input from the person, the autonomous agricultural production machine may switch from the safe operating state to the normal operating state.

Furthermore, in one or some embodiments, the instruction may comprise a rule defining an assignment of at least one further autonomous agricultural production machine and/or at least one manned agricultural production machine to assist the autonomous agricultural production machine that was operating while the irregularity occurred.

Since the instruction for switching the autonomous agricultural production machine from the safe operating state to the normal operating state may include numerous rules which may be initiated when the instruction is executed by the processing device, various irregularities in the operation of the autonomous agricultural production machine may be responded to in an ideal and tailored manner. Only when the irregularity is such that it cannot be circumvented by directly controlling the autonomous agricultural production machine, a person need be instructed to go to the autonomous agricultural production machine to switch it from the safe operating state to the normal operating state.

In one or some embodiments, various irregularities may be identified. By way of example, any one, any combination, or all of the following may be identified as irregularities: a defective work assembly of the autonomous agricultural production machine; a defective work assembly adapted to the autonomous agricultural production machine; or an obstacle on a route of the autonomous agricultural production machine.

In particular, in one or some embodiments, a static obstacle and/or a moving obstacle may be identified as an obstacle in the route of the autonomous agricultural production machine, such as an object, a vehicle and/or a living being.

Accordingly, the processing device is configured to process the data generated or determined by the sensor device in such a way that the processing device may make a highly precise determination or identification of the irregularity that has occurred in the operation of the autonomous agricultural production machine. This determination may be the basis for generating an instruction for switching the autonomous agricultural production machine from the safe to the normal operating state (alternatively, or in addition, vice-versa), which may allow for an ideal and tailored reaction to the irregularity that has occurred.

In one or some embodiments, the database may comprise a central database or a decentralized database, such as a blockchain database. More specifically, the database may comprise a cloud-based database.

In one or some embodiments, the sensor device comprises one or more sensors (such as a plurality of sensors) arranged or positioned on the autonomous agricultural production machine, on a work assembly adapted to the autonomous agricultural production machine and/or on a device, such as a drone, having traveled to and located in the immediate vicinity of the autonomous agricultural production machine and communicating therewith for transmitting data.

Various sensors are contemplated. By way of example, all sensors that may work with or without contact (e.g., contactless) known to those of skill in the art in the context of agriculture may be used to sense and/or generate data to determine operating parameters and environmental parameters of the autonomous agricultural production machine.

In one or some embodiments, a large number of sensors may be used (e.g., at least 5 sensors; at least 10 sensors; at least 15 sensors; at least 20 sensors; at least 25 sensors; etc.). The large number of sensors makes it possible to continuously determine a large amount of data concerning operating parameters and/or environmental parameters of the autonomous agricultural production machine, but at least at certain points in time (amongst potential numerous points in time) during the operation of the autonomous agricultural production machine, so that a sufficient foundation of data is created as an input variable for the identification of the irregularity by the processing device. This may allow the identification of the irregularity that has occurred to be performed very precisely. In response to identifying the irregularity, an instruction may be generated for switching the autonomous agricultural production machine from the safe operating state to the normal operating state that is exactly tailored to the existing or identified irregularity.

In one or some embodiments, the control device comprises at least one control unit arranged or positioned in any one, any combination, or all of: the autonomous agricultural production machine; a work assembly adapted to the autonomous agricultural production machine; or in a device (e.g., a drone) located in the immediate vicinity of the autonomous agricultural production machine and communicating therewith for transmitting data (e.g., located within Bluetooth communication range; located less than 100 feet from the autonomous agricultural production machine; located less than 50 feet from the autonomous agricultural production machine; located less than 20 feet from the autonomous agricultural production machine; or located less than 10 feet from the autonomous agricultural production machine).

As a result, the irregularity may be identified on-site (e.g., by a control device resident on or proximate to the autonomous agricultural production machine) and/or in real-time (or substantially in real time) (e.g., immediately while operating the autonomous agricultural production machine on an agricultural area). Responsive to identifying the irregularity, the instruction for switching the autonomous agricultural production machine from one state to another (e.g., from the safe operating state to the normal operating state; or from the normal operating state to the safe state). In response to receipt of the instruction, the autonomous agricultural production machine may be immediately switched to the safe operating state to avoid a critical operating situation. Accordingly, in one or some embodiments, at least one, at least a combination, or all of the following is performed locally: generating the data (e.g., sensor data) used to detect or identify the irregularity; processing the data in order to detect or identify the irregularity; transmitting the instruction indicating that the irregularity has been identified or detected. In this regard, the data at least for detecting an irregularity is not first transmitted to an external processing device for processing the same, which may result in an increased response time.

In one or some embodiments, the identification of the irregularity may be performed using the processing device, which may take into account reference data. In one or some embodiments, the reference data may comprise geodata, such as data that is local to or localized to the autonomous agricultural production machine during operation (e.g., data indicative of the current location of the autonomous agricultural production machine during operation; data indicative of at least one aspect of the field that the autonomous agricultural production machine during operation is currently operating; etc.). Thus, the reference data may comprise any one, any combination, or all of: localizing data of the autonomous agricultural production machine during operation; weather data (e.g., weather data for the field at which the autonomous agricultural production machine is operating); or agronomic data (e.g., any one, any combination, or all of soil data, inventory data, yield data, or area data). The reference data may be saved in the database and/or in a reference database independent of the database, and the processing device may communicate with the reference database in order to transfer data to and/or from the database.

In one or some embodiments, the use of reference data as another input variable in the analysis routine may increase accuracy in identifying the irregularity that occurred in the operation of the autonomous agricultural production machine.

In one or some embodiments, at least two autonomous agricultural production machines, such as a plurality of autonomous agricultural production machines, are monitored. Processing device(s) may identify irregularities and/or classify the irregularities. In one or some embodiments, the switching of the state of the autonomous agricultural production machine may depend on at least one aspect of the irregularity identified. For example, the classification of the irregularity may determine whether to execute the instruction to switch the state of the autonomous agricultural production machine (e.g., a first classification of the irregularity, which has a higher priority, may result in the execution of the instruction to change the state of the autonomous agricultural production machine (e.g., from the safe operating state to the normal operating state; or from the normal operating state to the safe operating state); whereas a second classification of the irregularity, which has a lower priority, may result in not executing the instruction to change the state of the autonomous agricultural production machine). In this regard, the execution of the instruction may be dependent on the prioritization of the classification of the irregularities.

In one or some embodiments, the classification may be based on one or more aspect of the irregularity, such as on any one, any combination, or all of: the severity of the irregularity; any costs incurred as a result of the problem due to a breakdown of the autonomous agricultural production machine; weather conditions; or the like.

In one or some embodiments, the classification of the identified irregularities and the prioritized execution of the instructions by the processing device in the event of the presence of a plurality of irregularities in a plurality of autonomous agricultural production machines at the same time may ensure that the autonomous agricultural production machine is first switched states (e.g., from the safe operating state to the normal operating state; or vice versa), the downtime of which would be economically the most serious if an irregularity were to occur.

In one or some embodiments, a data record containing the instruction for switching the autonomous agricultural production machine from one state to another (e.g., from the safe operating state to the normal operating state; or vice-versa) together with the identified irregularity and the corresponding data may be saved in the database as soon as or responsive to generating the instruction to switch.

In one or some embodiments, the data set is transmitted to a memory unit that is part of the control device.

This may mean that in the event that a specific irregularity occurs repeatedly, once the specific irregularity has been identified, the instruction saved in the database may be accessed and executed immediately by the processing device.

Furthermore, it is possible for the control device itself to access the data records saved in the memory unit of the control device and compare the collected data with the data in the data records saved therein. If a matching data record (which may include the sensor data indicative of the specific irregularity stored in the memory unit being matched to the sensor data currently being analyzed) is identified by the control device that contains the data determined by the control device, the instruction that is also saved may immediately be executed automatically by the control device (e.g., the instruction previously issued for the specific irregularity stored in the memory unit being used in the current instance where the same sensor data currently sensed is matched to the sensor data stored in the memory unit), such as by a control unit of the control device.

In one or some embodiments, the database and the processing device together may form a management system. In one or some embodiments, the management system is assigned to a first entity which is independent of at least one second entity to which is assigned the autonomous agricultural production machine and/or an agricultural area on which the autonomous agricultural production machine is operated, wherein use of the management system for performing the method steps may be enabled by the first entity when authorization is given.

Accordingly, the management system may optionally be assigned to the person (second entity), for example a farmer or a contractor, to whom the autonomous agricultural production machine and/or the agricultural area is assigned, or to an external service provider (first entity). The person (second entity), for example the farmer or contractor, may be granted the use by the service provider of the management system for performing the method according one or some embodiments by paying a fee. The execution of the method steps concerning the identification of the irregularity as well as the generation and execution of the instruction for switching the autonomous agricultural production machine from the safe operating state to the normal operating state may therefore be offered as a chargeable external service (e.g., an as-a-service functionality).

Referring to the figures, FIG. 1 illustrates an unmanned or autonomous agricultural production machine 1 with a work assembly 2 in the form of a cultivator adapted to the autonomous agricultural production machine 1 while operating on an agricultural area 3. For example, the autonomous agricultural production machine 1 may connect with a work assembly 2 via a mechanical connector 19. Alternatively, the work assembly 2 may be integrated within the autonomous agricultural production machine 1. In either instance, the autonomous agricultural production machine 1 may autonomously (such as automatically) performs a specific working step, such as plowing, on the agricultural area 3 (e.g., without an operator actively influencing the autonomous agricultural production machine 1 during its operation) using the work assembly 2. Even though the autonomous agricultural production machine 1 is illustrated with an adapted work assembly 2 in the embodiment depicted in FIG. 1, such an embodiment is not necessarily required for performing the method according to one or more aspects of the invention. Rather, the autonomous agricultural production machine 1 may also work autonomously on the agricultural area 3 without an adapted work assembly 2. Furthermore, work assemblies 2 to be adapted are not limited to the illustrated attachment. Rather, a wide variety of work assemblies, such as attachments, front attachments or the like, may be adapted to the autonomous agricultural production machine 1, depending on which working step is to be performed by the autonomous agricultural production machine 1. Even though the agricultural area 3 shown in FIG. 1 represents a field to be worked, it may just as well be a farmyard.

In addition to the adapted work assembly 2 shown in FIG. 1, the autonomous agricultural production machine 1 comprises various work assemblies 20, such as drive motors, transmissions or the like, which may be assigned to the autonomous agricultural production machine 1 itself. As such, the autonomous agricultural production machine 1 may automatically operate any one, any combination, or all of the various work assemblies of the autonomous agricultural production machine 1.

In one or some embodiments, the autonomous agricultural production machine 1 is operated on the agricultural area 3 completely automatically without being influenced by a person located in the vicinity of the autonomous agricultural production machine 1. However, just as when operating a conventional manned agricultural production machine, irregularities may occur during operation to which an appropriate reaction should be made so that the operation of the autonomous agricultural production machine 1 is to be monitored.

In order for the autonomous agricultural production machine 1 to be monitored, a sensor device is provided which is designed to determine data representing operating parameters and environmental parameters of the autonomous agricultural production machine 1. In one or some embodiments, the sensor device comprises one or more sensors, such as a plurality of sensors 4, which may be arranged or positioned on any one, any combination, or all of: on the autonomous agricultural production machine 1; on the adapted work assembly 2; or on a device 5 located in the immediate vicinity of the autonomous agricultural production machine 1. In FIG. 1, such a device 5 located in the immediate vicinity of the autonomous agricultural production machine 1 is shown as a drone. Other devices 5 are contemplated. All contact-free and contacting sensors known in the context of agriculture are possible as the sensors 4. Furthermore, a control device 14 is provided, which is configured to communicate (e.g., wired and/or wireless communication) or is connected (e.g., physically connected) to the sensor device, such as to the individual sensors 4 of the sensor device, to transmit data. In one or some embodiments, the control device 14 comprises at least one control unit arranged or positioned on any one, any combination, or all of in: the autonomous agricultural production machine 1; an adapted work assembly 2; or the device 5 located in the immediate vicinity of the autonomous agricultural production machine 1. In this regard, the control device 14 is the autonomous agricultural production machine 1 or proximate to (e.g., at least 5 feet; at least 10 feet; at least 20 feet; etc.) from the autonomous agricultural production machine 1. FIG. 1 illustrates that control device 14 is associated with or within the autonomous agricultural production machine 1. Control device 14 may likewise be associated with or within one or both of the adapted work assembly 2 or the device 5.

The control device 14 may comprise at least one processor 15 and at least one memory 16 that stores information and/or software, with the processor 15 configured to execute the software stored in the memory 16. In one or some embodiments, the control device 14 may comprise any type of computing functionality, such as the at least one processor 15 (which may comprise a microprocessor, controller, PLA, or the like) and the at least one memory 16. The memory 16 may comprise any type of storage device (e.g., any type of memory). Though the processor 15 and the memory 16 are depicted as separate elements, they may be part of a single machine, which includes a microprocessor (or other type of controller) and a memory. Alternatively, the processor 15 may rely on memory 16 for all of its memory needs.

The processor 15 and memory 16 are merely one example of a computational configuration. Other types of computational configurations are contemplated. For example, all or parts of the implementations may be circuitry that includes a type of controller, including an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

In one or some embodiments, the control device 14 may communicate (e.g., wired and/or wirelessly) or is connected (e.g., physically connected) to the sensor device, such as to the individual sensors 4 of the sensor device. For example, the control device 14 may include a communication interface 17, which is configured to communicate (e.g., wired and/or wirelessly) with the sensors 4 and/or configured to communication (wired and/or wirelessly) with one or more other external electronic devices, such as management system 8. In this regard, the control device 14 is configured to transmit and/or receive data. The above discussion regarding the at least one processor 15 and the at least one memory 16 may be applied to other devices, such as the management system 8 (e.g., processing device 7 within management system 8 may include at least one processor 15 and at least one memory 16, and may include a communication interface 17 in order to communicate (e.g., wired via the Internet and/or wirelessly) with various other electronic devices as discussed herein).

Furthermore, a database 6 is provided in which the data determined or generated by the sensor device, which may represent operating parameters and/or environmental parameters of the autonomous agricultural production machine 1, may be saved. The database 6, which may comprise an external database external to the autonomous agricultural production machine 1, may also communicate with or may be connected with both the sensor device and the control device 14 for the transmission of data. In addition to the database 6, a processing device 7 is provided through which data may be analyzed with respect to a specific objective. As discussed above, the processing device 7 may include at least one processor 15 and at least one memory 16 and may be configured to communicate with the database 6 or is connected to the database 6 for the transmission of data. In one or some embodiments, the processing device 7 further communicates with and/or is connected to the sensor device and/or the control device for the transmission of data. In one or some embodiments, the database 6 and the processing device 7 are external devices that are not located within any one, any combination, or all of: the autonomous agricultural production machine 1; the work assembly adapted thereto; the device 5 located in the immediate vicinity of the autonomous agricultural production machine 1; or in the vicinity of the agricultural area 3 on which the autonomous agricultural production machine 1 is operated. The database 6 and the processing device 7 together may constitute a database-driven management system 8.

The database 6 may be designed as a central database 6 or as a decentralized (e.g., distributed) database 6. If the database 6 is designed as a decentralized database 6, it may be designed as a blockchain database 6. Furthermore, the database 6 may be implemented as a cloud-based database 6.

Figure 2:
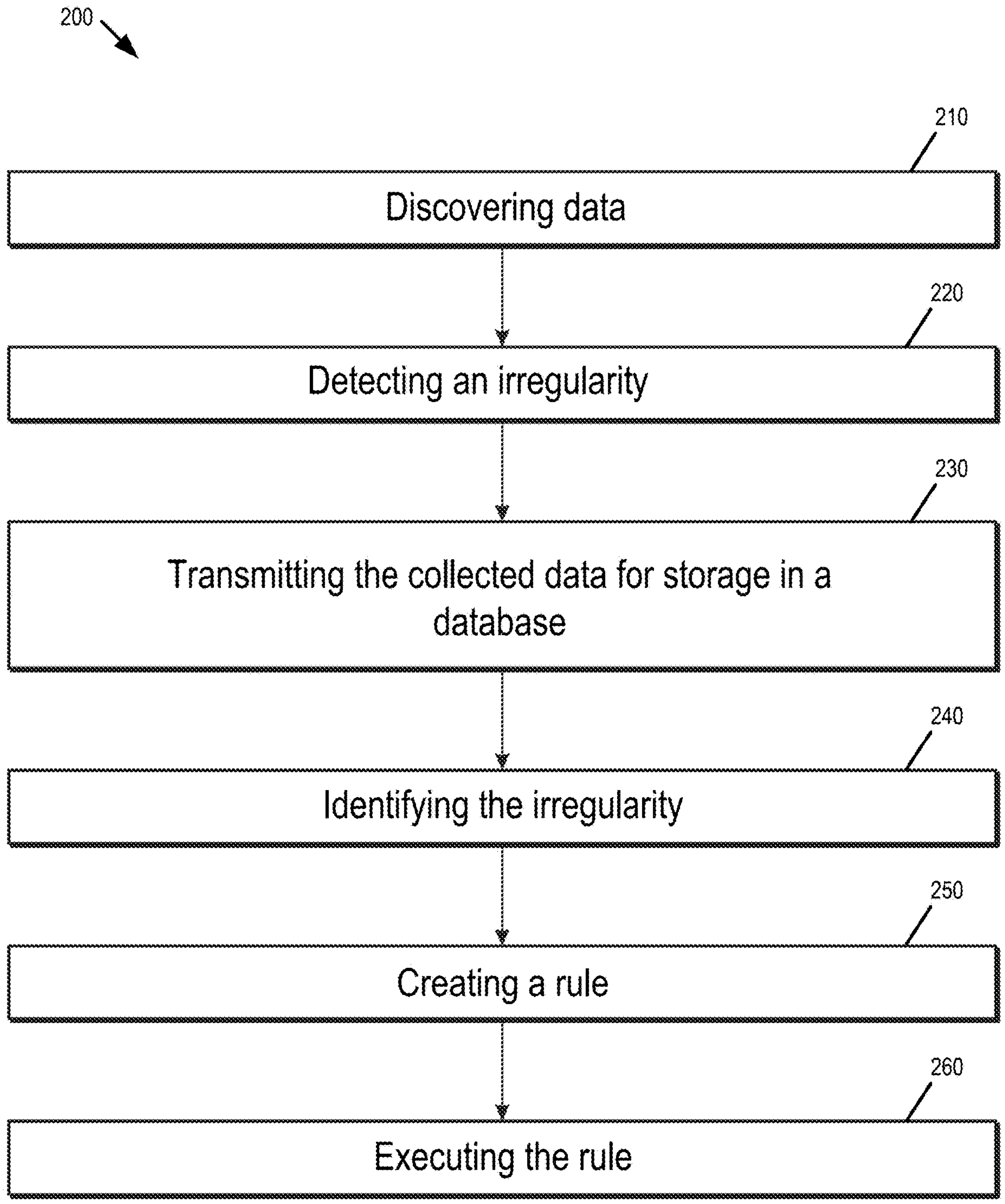
FIG. 2 illustrates a diagram that schematically and exemplarily reproduces a sequence of method steps of the method.

As mentioned above, monitoring may also be required for the operation of the autonomous agricultural production machine 1 so that any irregularities occurring during the operation of the autonomous agricultural production machine 1 that could lead to a critical operating situation during the operation of the autonomous agricultural production machine 1 may be responded to accordingly. With reference to FIGS. 1 and 2, in one or some embodiments, the method for monitoring the operation of at least one of the previously described autonomous agricultural production machines 1 will be described in detail below. For example, FIG. 2 illustrates a flow diagram 200 in which: at 210, data is discovered; at 220, an irregularity is detected; at 230, the collected data is transmitted for storage in a database; at 240, the irregularity is identified; at 250, a rule is created; and at 260, the rule is executed.

In one or some embodiments, the starting point for the method is the autonomous agricultural production machine 1, which is in automatic operation on the agricultural area 3. During automatic operation of the autonomous agricultural production machine 1, data representing operating parameters and/or environmental parameters of the autonomous agricultural production machine 1 are determined using the sensor device (e.g., one or more sensors 4). In this context, environmental parameters may be considered to be parameters that represent environmental characteristics within a certain radius around the autonomous agricultural production machine 1.

The data detected by the sensor device may be transmitted to the control device 14 and processed by the control device 14 to detect an irregularity in the operation of the autonomous agricultural production machine 1. In one or some embodiments, examples of an irregularity may be any one, any combination, or all of: a defective work assembly of the autonomous agricultural production machine 1; a defective work assembly 2 adapted to the autonomous agricultural production machine 1; or an obstacle 9 in the route to be followed by the autonomous agricultural production machine 1. The obstacle 9 may be a static obstacle 9 located in the route of the autonomous agricultural production machine 1 and or a moving or dynamic obstacle 9, such as a static or dynamic object, vehicle and/or living being.

If the control device 14 detects an irregularity in the operation of the autonomous agricultural production machine 1, the autonomous agricultural production machine 1 is configured to immediately switch operating states (e.g., switch to a safe operating state). A safe operating state may comprise an operating state in which the operation of the autonomous agricultural production machine 1 is interrupted. In one or some embodiments, the purpose of switching the autonomous agricultural production machine 1 to the safe operating state is to avoid a situation that is critical to the operation of the autonomous agricultural production machine 1 due to the irregularity that has occurred.

Simultaneously, or almost simultaneously (e.g., less than 0.1 second; less than 0.5 second; less than 1 second), with the detection of the irregularity, the data determined at the time of determining the irregularity using the sensor device are transmitted either by the sensor device itself or by the control device 14 to the database 6 and saved there. Once the data are saved in the database 6, the data are forwarded to the processing device 7 which, based on this data, may identify the irregularity that occurred during the operation of the autonomous agricultural production machine 1. For this purpose, the data, detected by the sensor device at the time the irregularity is detected or used to detect the irregularity, is analyzed or processed by the processing device in an analysis routine. The analysis routine may apply an analysis algorithm to identify the irregularity, by means of which the data determined by the sensor device are processed in such a way that the type of irregularity is determined. In one or some embodiments, in addition to the data determined by the sensor device, other so-called reference data 10 may be used in the analysis algorithm. For example, reference data 10 may comprise geodata, such as data by means of which the autonomous agricultural production machine 1 may be located during its operation, weather data and/or agronomic data (e.g., any one, any combination, or all of: soil data; crop data; yield data; or area data). The reference data 10 may also be saved in the database 6 or, however, in a reference database 11, which may be independent of the database 6 and which may communicate or may be connected to the processing device 7 for the transmission of data.

In one or some embodiments, the analysis algorithm is an adaptive analysis algorithm, (e.g., an analysis algorithm based on artificial intelligence (AI), such as an artificial neural network). The adaptive analysis algorithm may comprise an AI model and may be trained before performing a first identification by means of an initial data set defining assignments of data concerning various operating parameters and environmental parameters of autonomous agricultural production machines and irregularities made by means of manual annotation. In one or some embodiments, the data obtained while performing the method using the sensor device and the irregularities identified by the processing device 7 may be used for further training (or re-training) of the analysis algorithm.

Responsive to the analysis algorithm of the processing device 7 identifying the irregularity, the processing device 7 may generate an instruction and transmit the instruction to the autonomous agricultural production machine 1. Responsive to receiving the instruction, the autonomous agricultural production machine 1 may automatically change its state (e.g., the autonomous agricultural production machine 1 is transferred from the safe operating state to the normal operating state (e.g., an operating state in which the autonomous agricultural production machine 1 may continue its proper operation) or transfer to another state other than the normal operating state). In one or some embodiments, the processing device 7 may generate the instruction depending on the identified irregularity. For example, an instruction may be characterized by the fact that it defines at least one rule to be executed by the processing device 7 so that the autonomous agricultural production machine 1, which is in the safe operating state, may resume its normal operation, such as its properly planned operation.

Depending on the identified irregularity, the instruction may comprise a plurality of rules triggered by the processing device 7, once the instruction is executed by the processing device 7. For example, the instruction may comprise a rule defining a command by the processing device 7 to the autonomous agricultural production machine 1 to automatically continue operation. Such a command by the processing device 7 may be accompanied by parallel transmission of a modified route for the autonomous agricultural production machine 1. For example, if a static obstacle 9, such as a large rock or a deep hole, is identified as an irregularity by the processing device 7, an instruction with rules is generated by the processing device 7 to cause the processing device 7 to command the autonomous agricultural production machine 1 to modify its route, according to a modified route, in order to bypass the static obstacle 9.

Alternatively thereto, the instruction may comprise a rule defining an assignment of a person 12 to switch the autonomous agricultural production machine 1 from the safe operating state to the normal operating state. For example, if a defective work assembly of the autonomous agricultural production machine 1, or a defective work assembly 2 adapted to the autonomous agricultural production machine 1, is identified as an irregularity, the processing device 7 may generate an instruction including a rule which causes at least one electronic device (e.g., which causes the processing device 7) to instruct a person, for example, a person in charge of maintenance of the autonomous agricultural production machine 1, or a person with knowledge of the autonomous agricultural production machine 1 located in the vicinity of the agricultural area 3, to switch the autonomous agricultural production machine 1 from the safe operating state to the normal operating state on site, that is, on the agricultural area 3. In this regard, the processing device 7 may automatically send a communication (e.g., a text; an email; a telephone call) to the identified person in order to instruct the person regarding the maintenance. Thus, the communication, including the instruction, may include both an indication of the action the person is to take (e.g., switching the state of the autonomous agricultural production machine 1) and/or an indication of the specific agricultural machine in which to take the action on (e.g., an indication of the specific name of the autonomous agricultural production machine 1 and/or a current location of the autonomous agricultural production machine 1). In response to the person receiving the communication (which may be received by a mobile electronic device (such as a Tablet or a smartphone) associated with the person), the person may go to the autonomous agricultural production machine 1 and provide input (e.g., on a user interface 18 (such as a touchscreen) on the autonomous agricultural production machine 1, the user may input an indication that the state of the autonomous agricultural production machine 1 is to be switched according to the instruction the person received). In response to the input by the person, the autonomous agricultural production machine 1 may switch its state.

Provided that an irregularity has occurred in the operation of the autonomous agricultural production machine 1 that has led to an interruption of the operation of the autonomous agricultural production machine 1, it may be necessary to compensate for the downtime of the autonomous agricultural production machine 1 in order to be able to complete the work step or a work process with a plurality of working steps as planned. For this purpose, the instruction may comprise another rule defining a command of at least one additional autonomous agricultural production machine 1 and/or at least one manned agricultural production machine from an available vehicle fleet 13 to assist the autonomous agricultural production machine 1 during the operation of which the irregularity has occurred. As such, the instruction may be automatically sent and may result in commands being sent to at least one additional autonomous agricultural production machine 1 to automatically perform one or more operations in order to assist the autonomous agricultural production machine 1 and/or one or more instructions being sent to an electronic device (e.g., a smartphone) associated with a person who in turn is associated with the at least one manned agricultural production machine from the available vehicle fleet 13 in order to assist the autonomous agricultural production machine 1.

In one or some embodiments, once the instruction for switching the autonomous agricultural production machine 1 from the safe operating state to the normal operating state has been automatically generated by the processing device 7, a data record is saved in the database 6 containing the instruction for switching the autonomous agricultural production machine 1 from the safe operating state to the normal operating state together with the identified irregularity and the corresponding data (e.g., the data determined by the sensor device and optionally used reference data 10). This data set may further be transmitted to the memory unit which may be part of the control device 14.

Even though the method according to the invention for monitoring an autonomous agricultural production machine 1 has been described above, the method may equally serve for monitoring at least two autonomous agricultural production machines 1, such as a plurality of autonomous agricultural production machines 1. Provided that at least two autonomous agricultural production machines 1 are monitored, the identification of irregularities using the processing device 7 may include classifying the irregularities. The classification may be based on aspects, such as the severity of the irregularity, any costs incurred as a result of the problem due to a breakdown of the autonomous agricultural production machine, weather conditions or the like. As described above, for each identified irregularity of an autonomous agricultural production machine 1 of the at least two autonomous agricultural production machines 1, an instruction is generated for switching the state of the at least two autonomous agricultural production machines 1 (e.g., from the safe operating state to the normal operating state and/or vice versa) and transmitted to the at least two autonomous agricultural production machines 1. In response to receiving the instruction, the at least two autonomous agricultural production machines 1 may switch its respective state accordingly. In one or some embodiments, the execution of the instructions for switching the autonomous agricultural production machines 1 from the safe operating state to the normal operating state may then be subject to prioritization based on the classification of the above described irregularities. Therefore, if a plurality of irregularities are present in a plurality of autonomous agricultural production machines 1 at the same time, the autonomous agricultural production machine 1, whose downtime may be economically more (or most) serious when an irregularity occurs, may first be switched from the safe operating state to the normal operating state.

As previously mentioned, the database 6 and the processing device 7 together may constitute a database-driven management system 8. This database-driven management system 8 may be assigned to a first entity, for example an external service provider, which may be independent of a second entity, a person, for example a farmer or contractor, to whom the autonomous agricultural production machine 1 and/or the agricultural area 3 on which the autonomous agricultural production machine 1 is operated is assigned. In this context, a use of the management system 8 for performing the method steps performed using the database 6 and the processing device 7 may be released by the first entity (e.g., the service provider) if there is authorization. In particular, the second entity may have the use of the management system 8 for performing the method according to one aspect of the invention released by the first entity by paying a fee. The execution of the method steps concerning the identification of the irregularity as well as the generation and execution of the instruction for switching the autonomous agricultural production machine from the safe operating state to the normal operating state is therefore offered as a chargeable external service (e.g., an as-a-service functionality).

In one or some embodiments, the communication of the individual devices, units, work assemblies, machines and persons 1, 2, 4, 5, 6, 7, 8, 11, 12, 13 with each other may optionally be wired and/or wireless. Finally, it should be noted that the above-described embodiments are merely descriptive of the claimed teaching, but are in no way to be considered limiting or exhaustive.

Further, it is intended that the foregoing detailed description be understood as an illustration of selected forms that the invention may take and not as a definition of the invention. It is only the following claims, including all equivalents, that are intended to define the scope of the claimed invention. Further, it should be noted that any aspect of any of the preferred embodiments described herein may be used alone or in combination with one another. Finally, persons skilled in the art will readily recognize that in preferred implementation, some, or all of the steps in the disclosed method are performed using a computer so that the methodology is computer implemented. In such cases, the resulting physical properties model may be downloaded or saved to computer storage.

LIST OF REFERENCE NUMBERS

1 Autonomous agricultural production machine
2 Work assembly
3 Area
4 Sensor
5 Device
6 Database
7 Processing device
8 Management system
9 Obstacle
10 Reference data
11 Reference database
12 Person
13 Vehicle fleet
14 Control device
15 Processor
16 Memory
17 Communication interface
18 User interface
19 Mechanical connector
20 Work assembly
200 Flow diagram
210-260 Flow diagram steps

The invention claimed is:

1. A method for monitoring operation of at least one autonomous agricultural production machine, the method comprising:

determining, using at least one sensor device, data representing one or both of operating parameters or environmental parameters while the at least one autonomous agricultural production machine is operating in performing an agricultural job of the at least one autonomous agricultural production machine;

detecting, using a control device resident on the at least one autonomous agricultural production machine and based on the data, whether there is an irregularity during operation of the at least one autonomous agricultural production machine, wherein the at least one sensor device communicates with the control device for transmitting the data, wherein the control device is resident on at least one of the at least one autonomous agricultural production machine, an adapted work assembly connected to the at least one autonomous agricultural production machine, or the at least one sensor device;

responsive to detecting that there is the irregularity:

switching, by the control device, the at least one autonomous agricultural production machine to a safe operating state in which the operation of the at least one autonomous agricultural production machine is interrupted;

transmitting the data for storage in a database;

identifying, by a management system, which comprises a central server, remote from the at least one autonomous agricultural production machine, a type of the irregularity by processing the data and reference data in an analysis routine, wherein the reference data comprises one or more of geodata, weather data, or agronomic data and is not considered by the control device in determining whether there is the irregularity;

generating, by the management system based on the type of the irregularity, an instruction for switching the at least one autonomous agricultural production machine from the safe operating state to a normal operating state, wherein the normal operating state is a state in which operation of the at least one autonomous agricultural production machine continues;

transmitting the instruction to the at least one autonomous agricultural production machine; and responsive to receiving the instruction, the at least one autonomous agricultural production machine switches the at least one autonomous agricultural production machine from the safe operating state to the normal operating state.

2. The method of claim 1, wherein the instruction for switching the at least one autonomous agricultural production machine from the safe operating state to the normal operating state comprises:

a rule defining a command to the at least one autonomous agricultural production machine from the management system to the at least one autonomous agricultural production machine to continue operation.

3. The method of claim 1, wherein the irregularity comprises an obstacle;

wherein the type of irregularity comprises a type of obstacle;

wherein the instruction for switching the at least one autonomous agricultural production machine from the safe operating state to the normal operating state comprises:

a modified route, determined based on the type of obstacle, for the at least one autonomous agricultural production machine to follow that is different from a current route of the at least one autonomous agricultural production machine in performing the agricultural job in order to avoid the obstacle.

4. The method of claim 1, wherein the instruction for switching the at least one autonomous agricultural production machine from the safe operating state to the normal operating state comprises:

a rule defining a command for one or both of: at least one additional autonomous agricultural production machine that is different from the at least one autonomous agricultural production machine; or at least one manned agricultural production machine from a vehicle fleet to assist the at least one autonomous agricultural production machine during the operation of which the irregularity has occurred.

5. The method of claim 1, wherein the instruction for switching the at least one autonomous agricultural production machine from the safe operating state to the normal operating state comprises:

a rule defining a command for both of at least one additional autonomous agricultural production machine and at least one manned agricultural production machine from a vehicle fleet to assist the at least one autonomous agricultural production machine during the operation of which the irregularity has occurred.

6. The method of claim 1, wherein the instruction for switching the at least one autonomous agricultural production machine from the safe operating state to the normal operating state comprises:

a rule defining a command for a person to input, via a user interface on the at least one autonomous agricultural production machine, an instruction to switch the at least one autonomous agricultural production machine from the safe operating state to the normal operating state.

7. The method of claim 1, wherein the at least one sensor device comprises a plurality of sensors positioned in or on a drone located in a vicinity of the at least one autonomous agricultural production machine and communicating therewith for transmitting data.

8. The method of claim 1, wherein the control device comprises at least one control unit positioned in or on a drone located in a vicinity of the at least one autonomous agricultural production machine and communicating therewith for transmitting data.

9. The method of claim 1, wherein the geodata comprises data for locating the at least one autonomous agricultural production machine during its operation;

wherein the agronomic data comprises one or more of soil data, inventory data, yield data or area data;

wherein the reference data are saved in one or both of the database or in a reference database independent of the database; and wherein, responsive to generating the instruction, a data record is saved in the database or the reference database containing the instruction for switching the at least one autonomous agricultural production machine from the safe operating state to the normal operating state together with the irregularity and corresponding data.

10. The method of claim 1, wherein a plurality of autonomous agricultural production machines are monitored;

wherein identifying a type of irregularities using the management system includes classification of the type of the irregularities;

wherein executing instructions, by the management system, for switching the plurality of autonomous agricultural production machines from the safe operating state to the normal operating state is subject to prioritization based on the classification of the irregularities.

11. The method of claim 1, wherein the management system comprises the database and at least one processing device:

wherein the management system is assigned to a first entity which is independent of at least one second entity to which is assigned one or both of the at least one autonomous agricultural production machine or an agricultural area on which the at least one autonomous agricultural production machine is operated; and wherein use of the management system for identifying the irregularity and generating the instruction is enabled by the first entity when authorization is given.

12. An autonomous agricultural production machine comprising:

at least one communication interface configured to communicate with a management system;

at least one processor in communication with the at least one communication interface and configured to:

autonomously perform an agricultural job;

determine, using sensor data from at least one sensor device, data representing one or both of operating parameters or environmental parameters while autonomously performing the agricultural job;

detect, based on the data, whether an irregularity has occurred while autonomously performing the agricultural job, wherein the at least one processor is resident on the autonomous agricultural production machine;

responsive to detecting that the irregularity has occurred:

switch, by the at least one processor, to a safe operating state in which operation of the autonomous agricultural production machine is interrupted;

transmit the data for storage in an external database;

responsive to transmitting the data, receiving an instruction from the management system that comprises a central server, the instruction based on the management system identifying a type of the irregularity by processing the data and reference data in an analysis routine, with the instruction indicative of switching the autonomous agricultural production machine from the safe operating state to a normal operating state, wherein the reference data considered by the management system comprises one or more of geodata, weather data, or agronomic data and is not considered by the at least one processor in determining whether there is the irregularity, wherein the normal operating state is a state in which operation of the autonomous agricultural production machine continues; and responsive to receiving the instruction, switch the autonomous agricultural production machine from the safe operating state to the normal operating state.

13. The autonomous agricultural production machine of claim 12, wherein the type of irregularity comprises an obstacle:

wherein the instruction for switching the autonomous agricultural production machine from the safe operating state to the normal operating state comprises:

a modified route for the autonomous agricultural production machine to follow that is different from a current route of the autonomous agricultural production machine in performing the agricultural job.

14. The autonomous agricultural production machine of claim 12, wherein the instruction for switching the autonomous agricultural production machine from the safe operating state to the normal operating state comprises:

a rule defining a command for one or both of: at least one additional autonomous agricultural production machine that is different from the autonomous agricultural production machine; or at least one manned agricultural production machine from a vehicle fleet to assist the autonomous agricultural production machine during the operation of which the irregularity has occurred.

15. The method of claim 1, wherein the reference data, used by the management system to determine the type of the irregularity, comprises each of the geodata, the weather data, and the agronomic data; and wherein the control device does not consider the geodata, the weather data, and the agronomic data in determining whether there is the irregularity.

16. The method of claim 15, wherein the type of irregularity determined by the management system comprises a defective work assembly of or adapted to the at least one autonomous agricultural production machine; and wherein, responsive to determining the type of irregularity being the defective work assembly of or adapted to the at least one autonomous agricultural production machine, the management system:

determines a person with knowledge of the at least one autonomous agricultural production machine that located in a vicinity of an agricultural area of the at least one autonomous agricultural production machine; and sends an instruction to an electronic device associated with the person, with the instruction indicative of switching the at least one autonomous agricultural production machine from the safe operating state to the normal operating state on site on the agricultural area of the at least one autonomous agricultural production machine.

17. The method of claim 15, wherein the control device receives the data from the at least one sensor device and transmits the data for storage in the database; and wherein the control device transmits the data for storage in the database simultaneously or within a time period of detecting there is the irregularity.

18. The method of claim 7, wherein the at least one sensor device comprises a drone having traveled to and located in an immediate vicinity of the at least one autonomous agricultural production machine and communicating with the at least one autonomous agricultural production machine for transmitting the data.

19. The method of claim 1, wherein identifying the type of irregularity comprises identifying a severity of the irregularity and costs incurred as a result of the type of irregularity.

20. The method of claim 10, wherein a first autonomous agricultural production machine and a second autonomous agricultural production machine are each in the safe operating state; and wherein priority is given to one of the first autonomous agricultural production machine or the second autonomous agricultural production machine whose downtime from being in the safe operating state is economic impact is larger.

* * * * *